United States Patent
Wang et al.

[11] Patent Number: 5,878,035
[45] Date of Patent: Mar. 2, 1999

[54] METHOD AND APPARATUS FOR MIXING PROTOCOLS IN A RADIO MESSAGING SYSTEM

[75] Inventors: Zhonghe Wang, Lake Worth, Fla.; Kwok Keung Choi, Pleasanton, Calif.; Jyh-Han Lin, Keller, Tex.; Douglas I. Ayerst, Delray Beach, Fla.; Gregory Lewis Cannon, Keller; Jheroen Pieter Dorenbosch, Paradise, both of Tex.; Malik Khan, Elgin, Ill.; Leonard Nelson, Boynton Beach, Fla.

[73] Assignee: Motorola, Inc., Schaumburg, Ill.

[21] Appl. No.: 862,872

[22] Filed: May 23, 1997

Related U.S. Application Data

[63] Continuation-in-part of Ser. No. 566,497, Dec. 4, 1995, abandoned.

[51] Int. Cl.[6] .................................... H04J 3/16
[52] U.S. Cl. ................. 370/329; 370/347; 455/452
[58] Field of Search .............. 340/825.06, 825.14, 340/825.2, 825.21, 825.37, 825.39, 825.44; 370/328, 329, 330, 338, 311, 347; 455/343, 573, 574, 38.3, 38.1, 468, 452, 454

[56] References Cited

U.S. PATENT DOCUMENTS

| | | | |
|---|---|---|---|
| 4,427,980 | 1/1984 | Fennell et al. | 455/31.2 |
| 4,577,315 | 3/1986 | Otsuka | 370/311 |
| 4,713,808 | 12/1987 | Gaskill et al. | 370/314 |
| 5,325,088 | 6/1994 | Willard et al. | 370/313 |
| 5,392,287 | 2/1995 | Teidemann, Jr. et al. | 370/311 |
| 5,710,766 | 1/1998 | Schwendeman | 370/329 |
| 5,732,076 | 3/1998 | Ketseoglou et al. | 370/347 |

*Primary Examiner*—Chau Nguyen
*Assistant Examiner*—Ken Vanderpuye
*Attorney, Agent, or Firm*—R. Louis Breeden

[57] ABSTRACT

A method and apparatus allocates a first predetermined plurality of frame time slots (102) to a first protocol, and allocates a second predetermined plurality of frame time slots (102) to a second protocol having a base frame management capability. The base frame management capability is applied such that portable selective call receiving devices (10) utilizing the second protocol normally perform battery saving throughout the first predetermined plurality of frame time slots (102).

9 Claims, 6 Drawing Sheets

|    | 0  | 1   | 2   | 3   | 4  | 5    | 6  | 7   | 8  | 9    | 10  | 11  |
|----|----|-----|-----|-----|----|------|----|-----|----|------|-----|-----|
| F1 | SI | SII | SI  | SII | SI | SII  | SI | SII | SI | SII  | SI  | SII |
| F2 |    | SIII|     |     |    | SIII |    |     |    | SIII |     |     |
| F3 |    | SIII| SIV |     |    | SIII |    |     |    | SIII | SIV |     |
| F4 |    | SIII|     |     |    | SIII |    |     |    | SIII |     |     |

*FIG. 5* sf - SCI BASE FRAME
sc SCI COLLAPSE VALUE
ps +1 = DISTANCE BETWEEN PERSONAL CONTROL BASE FRAME
if - IS BASE FRAME
ic - IS COLLAPSE VALUE
pn +1 - NUMBER OF FAMILIES
pc - PERSONAL FRAME CLUSTER COLLPASE VALUE
cn + 1 - NUMBER OF PERSONAL FRAME
cs + 1 - DISTANCE BETWEEN ADDITIONAL PERSONAL CONTROL FRAMES pf - FIRST PERSONAL CONTROL BASE FRAME ps + 1 - DISTANCE BETWEEN PERSONAL CONTROL BASE FRAME ps - SPACING BETWEEN PERSONAL CONTROL BASE FRAME cs + 1 - DISTANCE BETWEEN ADDITIONAL PERSONAL CONTROL FRAMES cs - SPACING BETWEEN ADDITIONAL PERSONAL CONTROL FRAMES

METHOD AND APPARATUS FOR MIXING PROTOCOLS IN A RADIO MESSAGING SYSTEM

RELATED APPLICATION

This application is a continuation-in-part of application Ser. No. 08/566,497, filed Dec. 4, 1995 ABDN by Wang et al., entitled "Method for Dynamically Changing Control Frames for Selective Call Receiving Devices in a Mixed Systems Environment."

FIELD OF INVENTION

This invention relates in general to radio communication systems, and more specifically to a method and apparatus for mixing protocols in a radio messaging system.

BACKGROUND OF THE INVENTION

Selective call receiving devices receive messages that are broadcast by a service provider. Known selective call receiving devices have at least one address that is assigned to the device so that it can determine whether a received signal includes a message that is intended for it. A base control frame and a collapse value are also assigned to the selective call receiving device wherein the base control frame determines the first frame of a received signal that the device decodes to determine whether its address is present and the base frame and collapse value determine the subsequent control frames that the device decodes. The base frame and collapse value of a device set a battery saving cycle for the device so that it is not drawing a high level of power continuously, but "wakes up" only when it needs to look for its address. It is noted that the lower the collapse value, the more frequently the device is required to wake up. In accordance with a known signaling protocol, a system collapse value is also employed wherein the system collapse value is broadcast to the device. The device uses the smaller of its own collapse value or the system collapse value with its assigned base frame to determine the subsequent control frames that determine when it is to "wake up."

In order for service providers to service existing customers as well as new customers with a limited bandwidth, channel sharing among different systems is desirable. Channel sharing among different systems refers to channel sharing among different signaling protocols and/or different subzones. Subzones are formed as subdivisions of a zone when it is desirable to increase the capacity of the service provider. Because the coverage area of a zone is most likely continuous and control information is simulcast in the subzones, problems can arise when a physical channel is shared among subzones. Those problems are similar to the problems encountered when systems having different signaling protocols share channels.

In order to mix systems so that they can share bandwidth, one could broadcast a small system collapse value such as 0 or 1. This approach would overcome batching or scheduling inefficiencies and long delays. However, small system collapse values result in reduced battery life of the device and are not always desirable.

SUMMARY OF THE INVENTION

A first aspect of the present invention is a method in a radio messaging system for mixing protocols. The method comprises the steps of allocating a first predetermined plurality of frame time slots to a first protocol, and allocating a second predetermined plurality of frame time slots to a second protocol having a base frame management capability. The base frame management capability is applied such that portable selective call receiving devices utilizing the second protocol normally perform battery saving throughout the first predetermined plurality of frame time slots. The method further comprises the step of dynamically incrementing capacity available for sending information in the second protocol by instructing a portable selective call receiving device utilizing the second protocol, to monitor a frame of information transmitted in the first predetermined plurality of frame time slots.

A second aspect of the present invention is a controller in a radio messaging system for mixing protocols. The controller comprises an input device for inputting user control signals for adjusting operation of the controller, and a processor coupled to the input device for processing messages according to the user control signals. The controller further comprises a memory coupled to the processor for storing software for programming the processor. The processor is programmed to allocate a first predetermined plurality of frame time slots to a first protocol, and is further programmed to allocate a second predetermined plurality of frame time slots to a second protocol having a base frame management capability. The processor is further programmed to dynamically increment capacity available for sending information in the second protocol by instructing a portable selective call receiving device utilizing the second protocol, to monitor a frame of information transmitted in the first predetermined plurality of frame time slots. The base frame management capability is applied such that portable selective call receiving devices utilizing the second protocol normally perform battery saving throughout the first predetermined plurality of frame time slots.

A third aspect of the present invention is a radio messaging system for mixing protocols. The radio messaging system comprises a controller for receiving messages and for controlling a transmitter to transmit the messages. The controller comprises a processor. The radio messaging system further comprises the transmitter coupled to the controller for transmitting the messages, and portable selective call receiving devices coupled by radio to the transmitter for receiving the messages. The processor is programmed to allocate a first predetermined plurality of frame time slots to a first protocol, and is further programmed to allocate a second predetermined plurality of frame time slots to a second protocol having a base frame management capability. The processor is further programmed to dynamically increment capacity available for sending information in the second protocol by instructing a portable selective call receiving device utilizing the second protocol, to monitor a frame of information transmitted in the first predetermined plurality of frame time slots. The base frame management capability is applied such that the portable selective call receiving devices utilizing the second protocol normally perform battery saving throughout the first predetermined plurality of frame time slots.

DESCRIPTION OF THE PREFERRED EMBODIMENT

Figure 1:
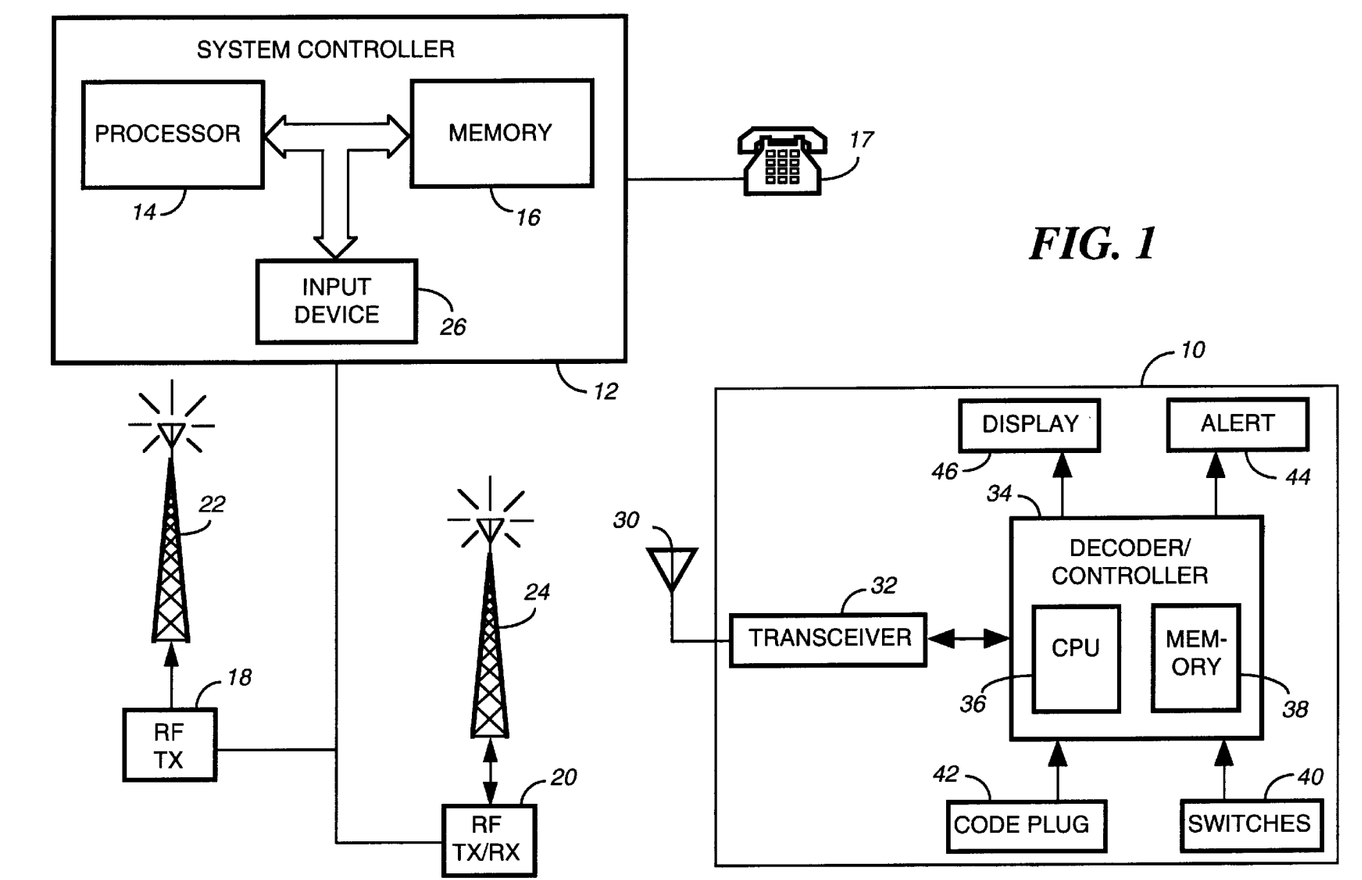
FIG. 1 is a block diagram of a selective call receiving device that is controlled in accordance with the method of the present invention in response to a signal broadcast by a system controller.

A portable selective call receiving device 10 that may be controlled in accordance with the method of the present invention to operate in a mixed systems environment is shown in FIG. 1. The selective call receiving device 10 has an associated signaling protocol and is a subscriber of a particular service provider. A controller 12, from which the device 10 receives broadcast information, is associated with the service provider of the device 10. The controller 12 is preferably capable of transmitting information to selective call receiving devices in different systems of the mixed systems environment, the different systems having different associated signaling protocols and/or subzones. In order for the controller 12 to service existing customers as well as new customers with a limited bandwidth, the controller 12 transmits information on frequency channels that are shared among the various systems i.e. signaling protocols and/or subzones. By dynamically changing the control frames that a selective call receiving device looks for to find its address in a received signal, the controller 12 is able to accommodate growth with respect to the number of customers that it services and with respect to the number of different types of signaling protocols accommodated.

As shown in FIG. 1, the controller 12 includes a processor 14 that operates in accordance with software stored in a memory 16 and that utilizes a scratch pad portion of the memory 16 to control the scheduling and encoding of messages received from an input device such as a telephone 17. The controller 12 preferably schedules and encodes messages in a number of different protocols such as the known POCSAG, FLEX™, and InFLEXion™ protocols for paging. The encoded messages are transmitted to an intended selective call receiving device 10 on an assigned radio frequency (R.F.) channel via one or more selected transmitter units 18 or transmitter/receiver units 20 having respective antenna 22, 24. Only two transmitter units are shown in FIG. 1 for simplicity, there typically being a large number of transmitter units coupled to a single controller 12 of a service provider. The transmitter units are preferably organized in zones wherein the zones are divided into subzones in which control information is simulcast. The division of zones into subzones allows the service provider to increase its capacity. An input device 26 such as a keyboard or the like is provided for the system controller 12 so that an operator may input various parameter values to affect changes for the accommodation of growth in the network.

The selective call receiving device 10 is shown in FIG. 1 in the form of a two-way pager. As will be appreciated, the present invention is applicable to other selective call receiving devices, such as one way communication devices or two-way communication devices that are not pagers, as well. The selective call receiving device 10 includes an antenna 30 for intercepting transmitted RF signals and for transmitting RF signals. The antenna 30 couples a received signal to a transceiver 32 wherein the transceiver 32 produces a data stream representative of a demodulated received signal that is coupled to a decoder/controller 34. The transceiver 32 is also responsive to a modulation input such as data received from the decoder/controller 34 to frequency modulate a carrier signal for transmission out from the selective call receiving device 10. The decoder/controller 34 includes a central processing unit or the like for processing demodulated signal information in accordance with software stored in a memory 38. A demodulated message is then displayed on a display 46 under the control of the decoder/controller 34. The decoder/controller 34 is also responsive to inputs from one or more switches 40 or other input devices to generate data that is coupled to the transceiver 32 for transmission out from the selective call receiving device 10.

A code plug memory 42 of the selective call receiving device 10 stores information originally assigned to the device 10. This information includes at least one address that identifies the device 10; a base control frame that determines the first frame in one cycle of the device's signaling protocol that the device 10 wakes up for in order to decode at least a portion of the frame to determine if its address is present; and a device collapse value that is used to determine the subsequent control frames in one cycle of the signaling protocol that the device 10 also decodes to determine if its address is present. When the decoder/controller 34 determines that there is a match between a received address and an address stored in the code plug 42 as determined by a comparison of the received and stored addresses, an alert signal is generated by a device 44 so as to alert a user that a message has been received by the device 10. It is noted that the alert signal may be an audible and/or a tactile alert such as a silent, vibrating alert.

Figure 2:
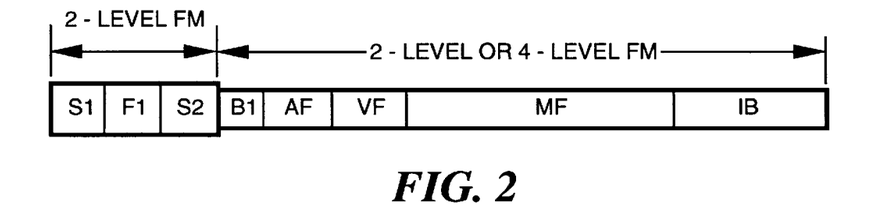
FIG. 2 is an illustration of a known signaling protocol.

In order to illustrate the different embodiments of the present invention, they will be described in relation to the FLEX™ family of signaling protocols. Each signaling protocol of the FLEX™ family has 128 frames per cycle in a 4 minute period wherein the frames are numbered from 0 to 127. Each of these frames has the field order illustrated in FIG. 2 wherein S1 is a synchronization pattern followed by a frame information word F1 which is in turn followed by a second synchronization word S2. Thereafter, block information words BI are followed by an address field AF, vector field VF, message field MF and idle blocks. The various embodiments of the method of the present invention allow different signaling protocols of the FLEX™ family to be mixed together and with other known signaling protocols such as POCSAG. However, the present invention is not limited to mixed systems with these protocols, but is applicable to mixed systems with other signaling protocols and/or subzones as well.

Figure 3:
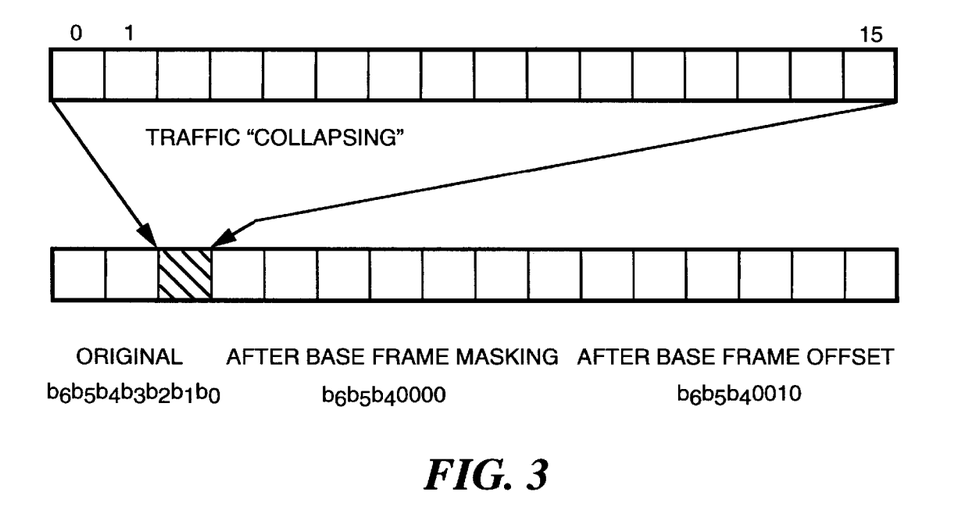
FIG. 3 is a graphic illustration of a method in accordance with one embodiment of the present invention for generating a new base frame from an originally assigned base frame and control frame information so as to collapse frame traffic of a number of frames into a single frame.

In accordance with one embodiment of the present invention as illustrated in FIG. 3, the system controller 12 collects message traffic dispersed among a number of frames into one frame to improve air time utilization in a mixed systems environment and to ease system migration. This embodiment further preserves the battery saving cycle of a selective call receiving device 10 which is determined by the frequency that the device 10 has to wake up to decode portions of a received signal to determine if the received signal contains the device's address. This method allows channel sharing between different signaling protocols to be easily accomplished.

In accordance with the method illustrated in FIG. 3, control frame information is transmitted in the block information words BI of the signaling protocol wherein a block information word is typically sent at the beginning of each frame in a cycle of the signaling protocol as discussed above. The control frame information includes a system base frame mask and a system base frame offset. The system base frame mask is an integer between 0 and N where there are $2^N$ frames in one cycle of the signaling protocol. For example, in a signaling protocol of the FLEX™ family having 128 frames in one cycle, the system base frame mask is an integer between 0 and 7. The system base frame offset is a number that is selected between 0 and $2^{(system\ base\ frame\ mask)} - 1$.

The decoder/controller 34 of the device 10 operating in accordance with this method is responsive to the receipt of a system based frame mask and a system based frame offset to modify its originally assigned base frame as stored in the code plug memory 42 to derive an effective or new base frame. Specifically, in response to the receipt of a system based frame mask M and a system base frame offset F, the decoder/controller 34 sets to zero the M least significant bits of the originally assigned base frame stored in the code plug 42 and then adds the offset F thereto in order to form the new base frame of the device 10.

As shown in FIG. 3, if the system base frame mask M is set equal to 4 and the system base frame offset F is set equal to 2, then the 4 least significant bits $b_3$, $b_2$, $b_1$ and $b_0$ of the subscriber's original base frame $b_6\ b_5\ b_4\ b_3\ b_2 b_1\ b_0$ are set to zero resulting in a masked base frame of $b_6\ b_5\ b_4 0000$. When the binary representation of the number 2 is added to the masked base frame, a new base frame $b_6\ b_5\ b_4 0010$ is formed. As a result of this transformation, the frame traffic of every 16 frames i.e. $2^4$, is collapsed to a single frame, whose frame number modulo 16 is equal to 2.

This method is extremely flexible and allows the base frame of a selective call receiving device 10 to be dynamically changed so that the controller 12 can service more traffic. For example, to serve a traffic load of one frame per minute in a system such as one utilizing the FLEX™ protocol having 128 frames on a channel during a 4 minute period of time, the system base frame mask M is set to 5 and the system base frame offset is set to any integer between 0 and 31. For another example, with a signaling protocol having one control frame and seven voice frames such as in the InFLEXion™ protocol, in order to set up one control frame every eight frames, the system base frame mask M may be set to 3 and the system base frame offset F may be set to an integer between 0 and $2^3-1=7$. In a mixed system with, for example, light FLEX™ protocol traffic and heavy POCSAG traffic, the system base frame mask M may be set to 6 and the system base frame offset F may be set to an integer between 0 and 63. This method preserves battery life and guarantees that the device 10, operating according to the standard FLEX™ signaling protocol, sees a full FLEX™ protocol frame every 2 minutes.

It is noted that where a system collapse value is transmitted in the control frame information from the controller 12 and the device 10 is programmed to utilize the smaller of a received system collapse value or its own device collapse value as stored in the code plug 42, the system base frame mask M should be set equal to or less than the system collapse value. As can be seen, in accordance with this method, when both the system base frame mask M and system base frame offset F are set to 0, the original base frame stored in the code plug 42 forms the new base frame.

Figure 4:
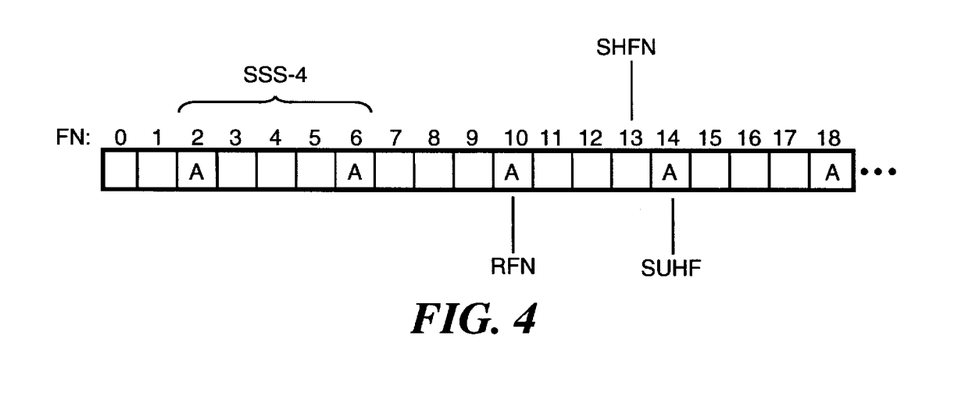
FIG. 4 is a graphic illustration of a second embodiment of the method of the present invention illustrating the transformation of an assigned base frame into a new base frame utilizing control frame information.
Figure 5:
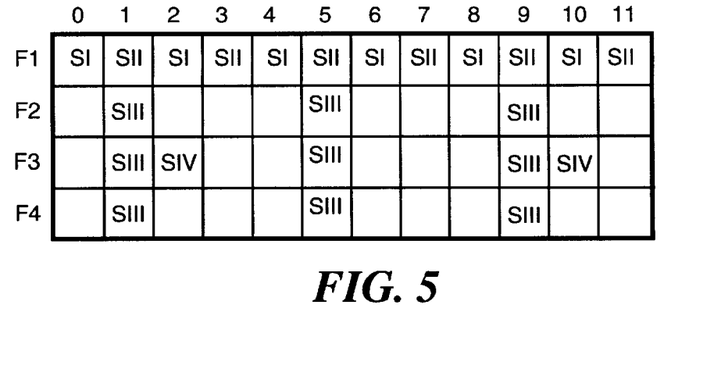
FIG. 5 is an illustration of multiple systems in a bandwidth sharing arrangement as made possible by the method illustrated in FIG. 4.

A second embodiment of the present invention is illustrated with respect to FIGS. 4 and 5. In accordance with this method, a selective call receiving device 10 derives a new base frame from its originally assigned base frame stored in the code plug memory 42, a system step size SSS and a reference frame number RFN. The system step size, SSS, represents the spacing in terms of the number of frames from one transmission to the next successive transmission from the same service provider in a particular zone/subzone. The value of the system step size SSS can be measured by the device 10 or it may be broadcast in the zone/ subzone of the device. For systems in which the signaling protocol is fixed or for systems where the control channel traffic becomes a bottleneck for the system capacity, it is preferable that the selective call receiving device 10 derives the SSS value by monitoring a channel to determine the spacing between successive transmissions of its service provider as determined by a system ID and service provider ID contained within the signal. For systems in which the system step size is broadcast, three bits of information I are added in the frame information word or in the block information words of the signaling protocol, where I is used to determine SSS. If all of the frequency channels in a particular system share the same SSS, the I bits can be carried in the frame information word or in the block information word other than those used for outbound channels. Otherwise, if different outbound channels in the system require their own SSS, the I bits are preferably carried in the block information words for the outbound channels.

The value of the three bits of information I ranges from 0 to 7 and is mapped to system step size ranges from 1 to 128 by setting SSS equal to $2^I$. For example, if a broadcast I is set equal to 011 or 3, the next active frame for the system will be SSS=$2^3$=8 frames away. If I=0, the system uses every frame of a frequency channel as a control frame. The power of 2 mapping for the system step size is selected to reduce the additional control information introduced by this method and to simplify the derivation of the new base control frame and subsequent control frame locations.

It is noted, that in accordance with this method, if a zone is not subdivided into subzones, the zone is treated as a subzone. Further, due to the interference of nearby subzones, the transmission quality of subzone specific information is typically unacceptable if the control information is simulcast inside the zone. However, in accordance with the present method, the orthogonal nature of the subzone control channel ensures the control channel quality in the subzone environment. All of the common zone information, such as the zone ID, is repeated in the subzones on the orthogonal control channels. Because control information is simulcast in a subzone, this method is flexible and efficient.

It is further noted that the number of systems that share the frequency channels, the number of service providers that share the system, the traffic demands from various systems and the traffic distribution of different systems in each zone/subzone are unpredictable. Thus, the required capacity and the location of the control channels of a system from a given service provider in a zone/subzone are also unpredictable. As a result, the control channel that a selective call receiving device 10 is looking for may be in any one of the frames of a given signaling protocol cycle. Therefore, in accordance with this method, the selective call receiving device 10 searches all of the physical channels where a physical channel is defined as the combination of a frequency channel and a particular time frame, until a frame with the correct system ID and service provider ID is found. The correct system ID and the correct service provider ID are those that are associated with the selective call receiving device 10. The frame number of the first found frame with the selective call receiving device's system ID and service provider ID is designated as the reference frame number RFN.

In accordance with this method, the new base frame designated as SUHF for a selective call receiving device 10 is derived from the reference frame number RFN, the system step size SSS and the device's originally assigned base frame number, herein designated as SHFN, in accordance with the following equation:

$$SUHF=mod(RFN, SSS)+SHFN-mod(SHFN, SSS).$$

FIG. 4 illustrates an example of a new base frame calculation wherein the abbreviation FN refers to frame number and A indicates that a system associated with the selective call receiving device 10 is active in a particular frame in the zone/subzone. In this example, it can be seen that the system associated with the device 10 has a system step size of 4, i.e. each frame in which the system of the device 10 is active is the fourth frame from the succeeding frame in which the system of the device 10 is active. In this example, it is assumed that the reference frame number is 10 and that the base frame number of the selective call receiving device is equal to 13. Then, in accordance with the above equation for calculating the new base frame SUHF, it is found that $$SUHF=mod(10, 4)+13-mod(13, 4)=14.$$

In order to determine subsequent control frames in one cycle of a signaling protocol for a selective call receiving device 10 in accordance with this second method, a device step size value SUSS is defined as the spacing in frames from one frame in which the device can access its associated system/service provider to the next successive frame in which the device can access its system/service provider. SUSS may be defined by the following equation:

$$SUSS=max(min(CM,CV), SSS)$$

where CM is the system collapse mask or value and CV is the collapse value of the device 10 as stored in the code plug memory 42. If, in the above example, the device's collapse value CV is 16 and the system collapse value is 32, then $$SUSS=max(min(32, 16),4)=16.$$

In accordance with this method, the selective call receiving device 10 needs to wake up to detect its address in a received signal for only the following frames:

wake up frame=$SUHF+n(SUSS)$ where n ranges from 0 to N-1 and N is an integer set equal to 128/SUSS for a system having a signaling protocol with 128 frames per cycle. In the above example, the selective call receiving device 10 therefore wakes up in frames 14, 30, 46, 62, 78, 94, 110 and 126. All of the systems operating in the mixed systems environment implement the control channel access rules set out in the above equations defining SUHF and SUSS to enable dynamic channel sharing. It is noted that in an environment in which channels are not shared among different systems, SSS is equal to 1, SUHF is equal to SHFN and SUSS=min(CM, CV).

Utilizing the method described above allows various channel sharing arrangements in a zone/subzone among various systems with different signaling protocols in the FLEX™ family. FIG. 5 illustrates one possible channel sharing scheme wherein SYSTEM I, SI, may have for example a standard FLEX™ signaling protocol, SYSTEM II, SII, may have a POCSAG signaling protocol where SYSTEM I and SYSTEM II share the same frequency channel F1 in a particular zone/subzone. In this arrangement all of the even frames of the frequency channel F1 are used for SYSTEM I; whereas the odd frames of the frequency channel F1 are used for SYSTEM II. SYSTEM III, SIII, may have an InFLEXion™ signaling protocol that has access to three frequency channels with a system step size SSS equal to 4. The SYSTEM IV may have a ReFLEX™ signaling protocol where SYSTEM IV shares the frequency channel F3 with the SYSTEM III and SYSTEM IV has a system step size SSS that is equal to 8. It is noted that the various customers of a system may have different step sizes. Further, all of the blank frames may be used for message traffic reuse among different systems. This method is simple, dynamic and spectrum efficient.

In accordance with a third embodiment of the present invention as illustrated in FIGS. 6–9, clusters are employed for dynamic frame management. A cluster is a group of frames where the frames can be control frames and/or message frames. A set of clusters is formed by grouping certain clusters in one cycle of a signaling protocol. A set of clusters can be considered a time division multiplex channel. Two or more paging systems or subzones can share the same physical channels using the cluster set concept. Paging systems or subzones can use different sets of clusters of the same frequency, because they are orthogonal in time.

Figure 6:
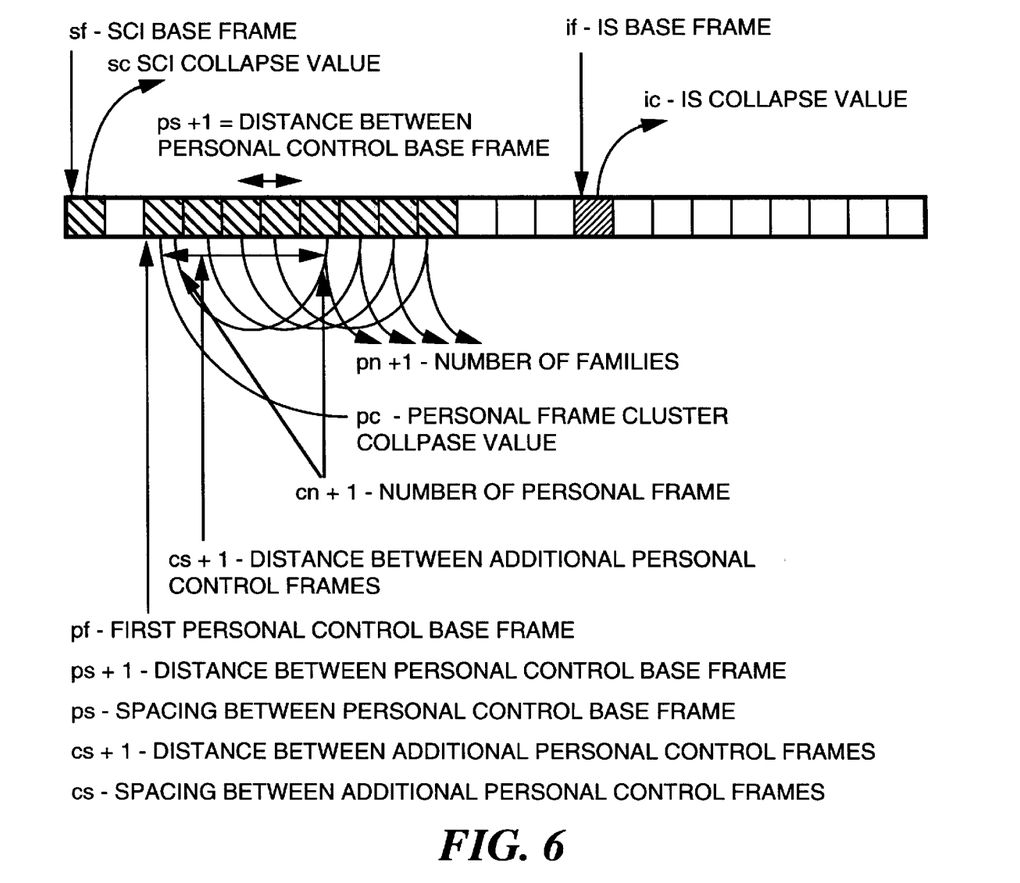
FIG. 6 is a graphic illustration of a further embodiment of the method of the present invention illustrating control frame information.

Reference frames designated in this embodiment as system configuration information (SCI) frames are those frames that carry forward channel information, reverse channel information, ALOHA time-out and base frame management information. The location of the first SCI frame in one cycle of the signaling protocol is selected by the system controller 12. The subsequent SCI frames are determined by a system configuration collapse value. The first system configuration frame or system configuration base frame is designated as sf. The system configuration collapse value is designated by sc, as shown in FIG. 6 where SCI frames are spaced by $2^{sc}$. For a signaling protocol having 128 frames in a cycle, the system configuration collapse value sc may be within the range 0–7.

In accordance with the present method, a selective call receiving device scans the frequency channels for a reference or system configuration frame sf. Once a system configuration frame is found, the device 10 checks the service provider ID included in this frame. If the service provider ID is associated with the device 10, the device 10 utilizes frame management information included in the system configuration frame to derive a new base frame for the device 10 as well as subsequent control frames. The frame management information in the systems configuration frame includes the system configuration collapse value sc as well as the following additional information: if, ic, pc, pf, pn, ps, cn and cs. The value "if" represents the first Information Services (IS) frame in a cycle of the signaling protocol where IS frames are used to carry broadcast messages for information services such as sports, weather, group messages, etc. The subsequent IS frames are determined by an information service collapse mask that is given by the value ic. IS frames are spaced by $2^{ic}$ frames. For a signaling protocol having 128 frames in a cycle, the first information services frame in a cycle may vary within the range 0–127 and the information service collapse mask ic may vary within the range of 0–7. A step value pc contained in the frame management information represents a cluster collapse value wherein $2^{pc}$ represents the distance between the first frame of each cluster of the same set. A pf value represents a first possible device control frame in one cycle of a signaling protocol. The sum (pn+1) represents the number of device families i.e. signaling protocols that are defined for a cluster. A ps value represents the distance between device control frames in each cluster. A cn value represents the number of additional control frames that each selective call receiving device checks in a cluster and cs is another distance value representing the distance between additional device control frames in each cluster for the same device 10.

A selective call receiving device can determine the location of all of the system configuration information (SCI) frames based on the following equation:

$$SCI\ frames = sf + i(2^{sc})\ where\ i=0, 1, 2, \ldots$$

It is noted that this frame calculation as well as those described below are based on modulo 128 for signaling protocols having 128 frames per cycle. For example, if sf is set equal 10 and sc is set equal to 5 then the SCI frames are 10, 42, 74 and 106.

The information services or IS frames are found in accordance with the following equation:

$$IS\ frames = if + i(2^{ic})\ where\ i=0, 1, 2, \ldots$$

Again, since all frame calculations are based on modulo 128, if the value ic equals 7, then $2^{ic}=2^7=128$, so that there is only one IS frame identified by if.

A selective call receiving device 10 derives its new base frame from the value pf which is a first possible base control frame and the step value ps that represents the spacing between different base control frames for other devices in the same system as the device 10. More specifically, the device 10 calculates its new base frame in accordance with the following equation: base frame$_i$=pf+i(ps+1) where i=0, . . . , pn. The value i is determined for a particular selective call receiving device 10 in accordance with the address of the device. Specifically, i is defined by the equation:

$$i = mod(right\ shift\ (a, 11), pn+1).$$

For example, if a selective call receiving device has an address of 00000000000000001000000000000, then right shift (00000000000000001000000000000, 11)= 00000000000000010. Where there are 4 device families so that pn+1=4, the value i for this selective call receiving device is equal to 2. Therefore, when the value i=2 is used to calculate the base frame for this selective call receiving device where the first possible base control frame in the cycle, pf, is equal to 10 and ps is equal to 1, then the new base frame calculated for this particular selective call receiving device is equal to 10+2(2)=14.

In order to find the subsequent control frames for a device with an address a, the following equation is employed by the selective call receiving device 10:

$$control\ frames_j = base\ frame_i + j(2^{pc}) + k(cs+1)\ where\ j=0 \ldots 2^{7-pc}-1$$
$$and\ k=0,1, \ldots, cn.$$

Therefore, if cn is set to 0 and pc is set to 5, the device 10, having the address in the above example, has control frames at 14, 46, 78 and 110.

The controller 12 can calculate the starting frames of the clusters in the same set according to the following equation:

$$cluster\ starts = pf + j(2^{pc})\ where\ j=0, \ldots 2^{7-pc}-1$$

For example, where pc is set equal to 5, the clusters of the set start at 10, 42, 74 and 106.

Figure 7:
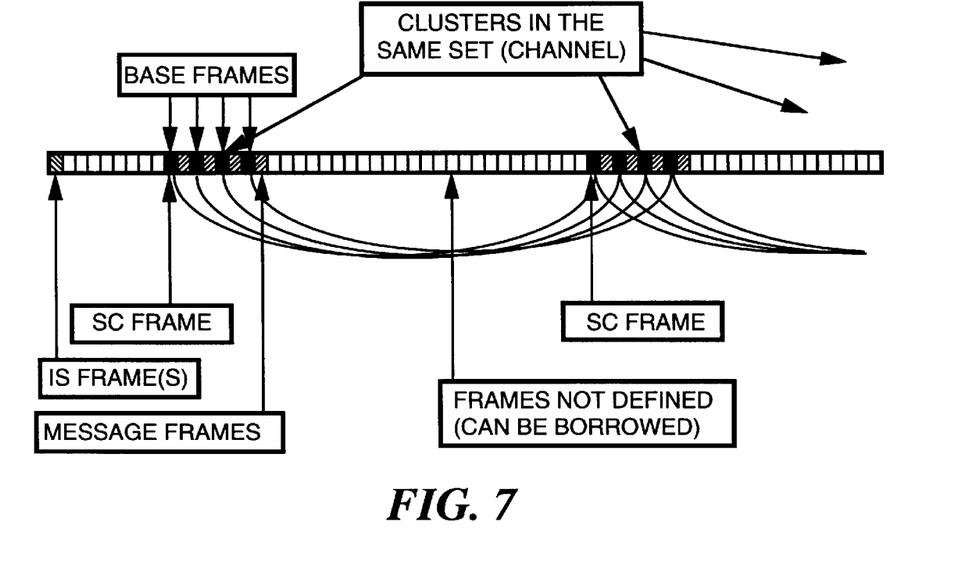
FIG. 7 is an illustration of a first design example implemented in accordance with the method depicted in FIG. 6.

FIG. 7 illustrates the design of a system in accordance with this third embodiment of the present invention wherein the system parameters are as follows. There are four clusters in each cycle having 128 frames so that $128/4=32=2^5$ and pc=5. In each cluster there are 8 frames, 4 of which are control frames so that ps+1=8/4=2 and ps=1. Four device families are defined in the system so that pn+1=4 and pn=3. Each device 10 checks only one of the control frames in each cluster so that cn=0. Further, there are 4 system configuration frames in each cycle so that 128/4=32=25 and sc=5. An IS frame is in the beginning of each cycle and it can carry on to the following frames if necessary. In addition to the above, the system configuration frame starts at frame 10 so that sf=10 and the first possible control frame starts at frame 10 so that pf=10. Based on these parameters, the system configuration frames are 10, 42, 74 and 106. The IS frame is 0. The 4 clusters start at 10, 42, 74 and 106. The cluster length is 8. The base frames for the 4 device families are respectively 10, 12, 14 and 16 and the corresponding control frames for the device families are:

control frames$_0$=10, 42, 74 and 106 control frames$_1$=12, 44, 76 and 108 control frames$_2$=14, 46, 78 and 110 control frames$_3$=16, 48, 80 and 112

It is noted that a set of clusters of control frames for other systems can be inserted into the blank frames that are not used by the systems or device families described above.

Figure 8:
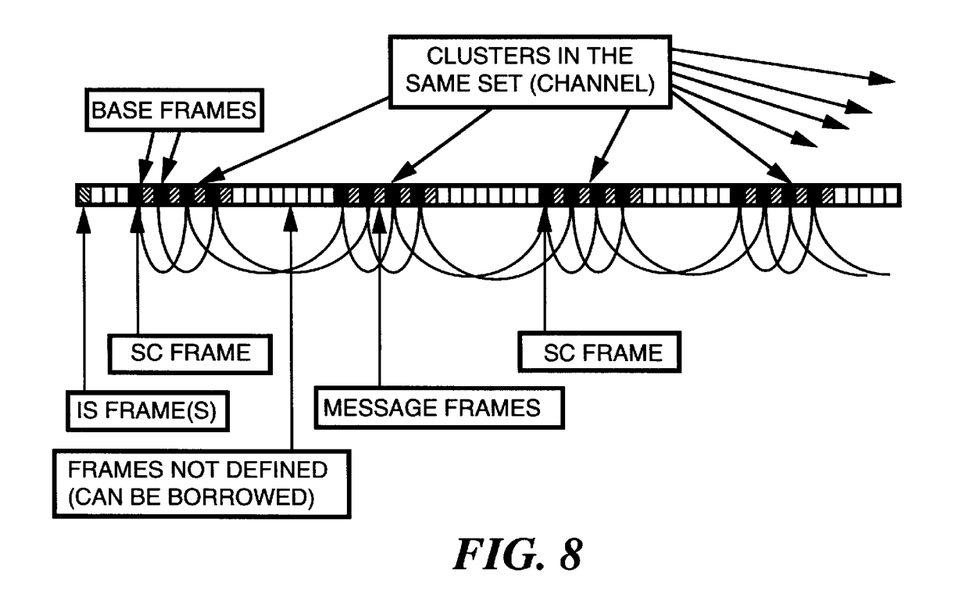
FIG. 8 is an illustration of a second design example implemented in accordance with the method depicted in FIG. 6.

In a second example of this embodiment of the present invention as illustrated in FIG. 8, there are 8 clusters in each cycle so that pc=4. In each cluster there are 8 frames, 4 of which are control frames so that ps=1. Two device families are defined in this system so that pn+1=2 and pn=1. Each device 10 checks two of the control frames in each cluster so that cs+1=8/2=4 and cs=3 and cn+1=2 so that cn=1. There are four system configuration frames in each cycle so that 128/4=32=2 and sc=5. Further, 2 IS frames are in each cycle so that the IS frames start at frame 0 and appear every 64 frames. Therefore, if=0 and ic=6 since 64=26. If the first system configuration frame starts at frame 4 so that sf=4 and the first control frame starts at frame 4 so that pf=4 then, these system parameters result in the following. The system configuration frames are 4, 36, 68 and 100. The IS frames are 0 and 64. The eight clusters start at frames 4, 20, 36, 52, 56, 84, 100 and 116. The cluster length is 8. The base frames for the device families are 4 and 6. Further, the corresponding control frames for device families are:

control frames$_0$=4, 8, 20, 24, 36, 40, 52, 56, 68, 72, 84, 88, 100, 104, 116 and 120 control frames$_1$=6, 10, 22, 26, 38, 42, 54, 58, 70, 74, 86, 90, 102, 106, 118 and 122

Figure 9:
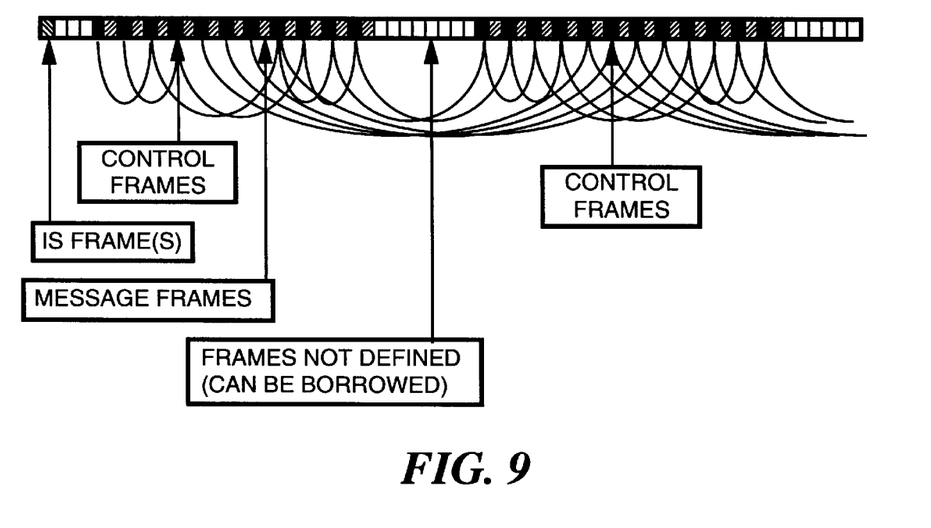
FIG. 9 is a third system design example implemented in accordance with the method depicted in FIG. 6.

Using the dynamic frame management technique of this third embodiment, multiple systems can share the same channel by time division multiplexing the systems. Most of the frames in the previous two examples are orthogonal in time such that they do not overlap in the time domain. These systems can be mixed to operate on the same frequency channel as shown in FIG. 9 wherein the IS frames can be shared between the systems if desired. The parameters of these systems can be changed dynamically to have different sharing combinations and more systems can be added so that this embodiment is very flexible.

Figure 10:
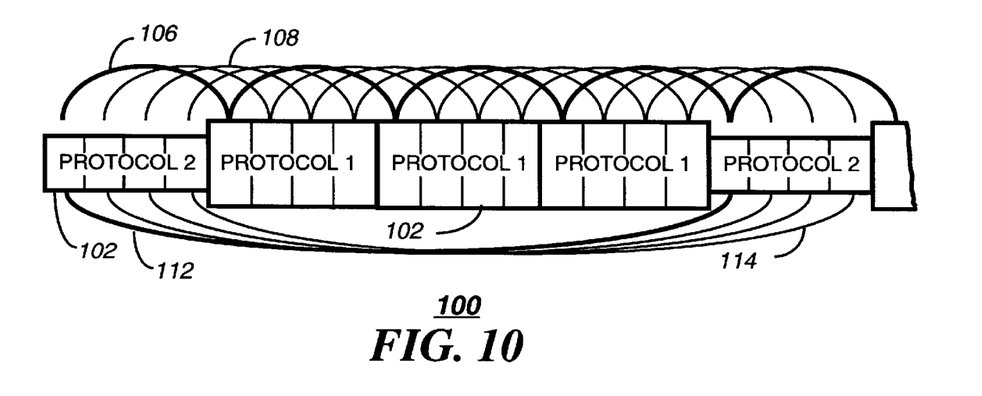
FIGS. 10 and 11 are graphic illustrations of mixing protocols in accordance with the present invention.

FIG. 10 is a graphic illustration 100 of mixing first and second protocols in accordance with the present invention. In the illustration 100 the first four frame time slots 102 are allocated by the system to PROTOCOL 2, e.g., the ReFLEX™ protocol, which utilizes base frame management. The next twelve frame time slots 102 are allocated by the system to PROTOCOL 1, e.g., the FLEX™ protocol. This allocation thus provides a transmitted mix of 75% PROTOCOL 1 frames and 25% PROTOCOL 2 frames. As is true for the FLEX™ and ReFLEX™ protocols, the first and second protocols preferably are synchronous protocols, each comprising a frame cycle having a predetermined duration, e.g., 4 minutes, and comprising a plurality of frames to be sent in a predetermined number of frame time slots, e.g., 128 frame time slots. The first and second predetermined pluralities of frame time slots preferably are allocated such that they have a total duration equal to the predetermined duration of the frame cycle and such that a total count of the first and second predetermined pluralities of frame time slots is equal to the predetermined number of frame time slots.

Each contiguous group of the frame time slots 102 assigned to the same protocol is defined to be a "protocol group." For the purpose of illustration the receiving devices 10 which utilize PROTOCOL 1 operate with a collapse value of 2 and thus wake up every four frame time slots 102. The heavy arcs 106 represents the operation of the battery saving cycle of the receiving devices 10 which utilize PROTOCOL 1 and "wake Up" during the first frame time slot 102 and every fourth frame time slot 102 thereafter. The thin arcs 108 represent battery saving operation of other receiving devices 10 that utilize PROTOCOL 1 and receive during the second, third, or fourth frame time slots 102 and every fourth frame time slot thereafter. Because PROTOCOL 1 does not utilize base frame management, the receiving devices 10 that utilize PROTOCOL 1 do not perform battery saving throughout the frame time slots 102 allocated to PROTOCOL 2. The PROTOCOL 1 receiving devices 10 are not confused by the PROTOCOL 2 frames, because the first and second protocols preferably utilize a protocol identifier near the beginning of each transmission frame, as is done, for example, in the FLEX™ family of protocols. If a PROTOCOL 1 receiving device 10 wakes up and receives a non-PROTOCOL 1 transmission, the PROTOCOL 1 receiving device 10 preferably returns immediately to a battery saving mode.

The base frame management of PROTOCOL 2 preferably is programmed such that the first four frame time slots 102 are the base frame time slots, while the collapse is set to 4 (receivers wake up every 16 frame time slots). This advantageously allows the receiving devices 10 that utilize PROTOCOL 2 to battery save throughout the frame time slots allocated to PROTOCOL 1. As before, the heavy arcs 112 depict the operation of the battery saving cycle of the receiving devices 10 which utilize PROTOCOL 2 and which receive during the first frame time slot 102. The thin arcs 114 represent battery saving operation of other receiving devices 10 that utilize PROTOCOL 2 and receive during the second, third, or fourth frame time slots 102.

It will be appreciated that, alternatively, other values of collapse can be utilized as well for the first and second protocols, depending on battery saving and latency trade-offs, as well as the relative amounts of traffic using the first and second protocols. Preferably, the frame time slots 102 are allocated such that the number of frame time slots 102 in the two protocol groups is an integer power of two. Having been so allocated, the base frames and collapse value used for PROTOCOL 2 are preferably set to values that will provide greatest battery saving for the receiving devices 10 that utilize PROTOCOL 2 by keeping them "asleep" throughout the frame time slots allocated to PROTOCOL 1. It will be further appreciated that the transmission cycle can begin either with PROTOCOL 2, as depicted, or, alternatively, with PROTOCOL 1, and that more than two protocols can be allocated among the frame time slots 102 to form a plurality of protocol groups. It will be further appreciated that the receiving devices 10 that utilize a protocol having base frame management can advantageously optimize their battery saving operation when the total number of frame time slots allocated to the plurality of protocol groups is an integer power of two.

Figure 11:
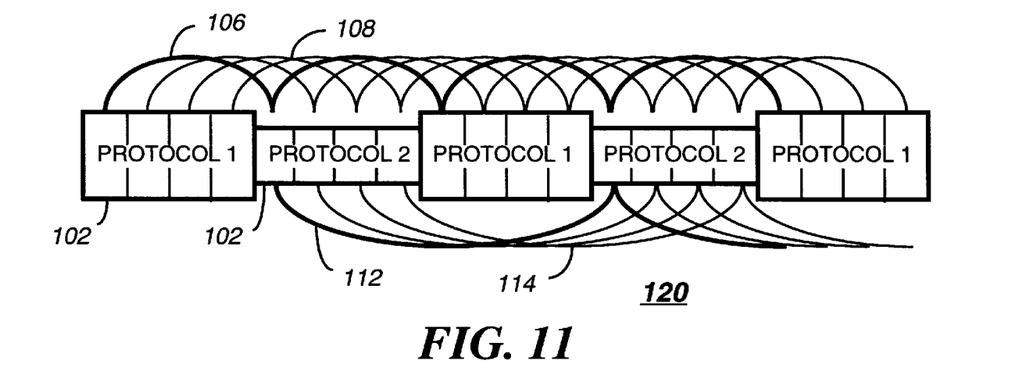

FIG. 11 is similar to FIG. 10, the essential difference being that a transmitted mix of 50% PROTOCOL 1 frames and 50% PROTOCOL 2 frames is depicted in the graphic illustration 120. In addition, the graphic illustration 120 depicts the transmission cycle starting with PROTOCOL 1. Here, the PROTOCOL 1 receiving devices 10 again operate with a collapse of 2 and wake up every four frame time slots 102, as depicted by the heavy and thin arcs 106, 108. The base frame management of PROTOCOL 2 preferably is programmed such that the fifth, sixth, seventh, and eighth frame time slots 102 are the base frame time slots, while the collapse is set to 3 (receivers wake up every 8 frame time slots 102). This advantageously allows the receiving devices 10 that utilize PROTOCOL 2 to battery save throughout the frame time slots allocated to PROTOCOL 1. As before, the heavy and thin arcs 112, 114 depict the operation of the battery saving cycle of the receiving devices 10 which utilize PROTOCOL 2.

Figure 12:
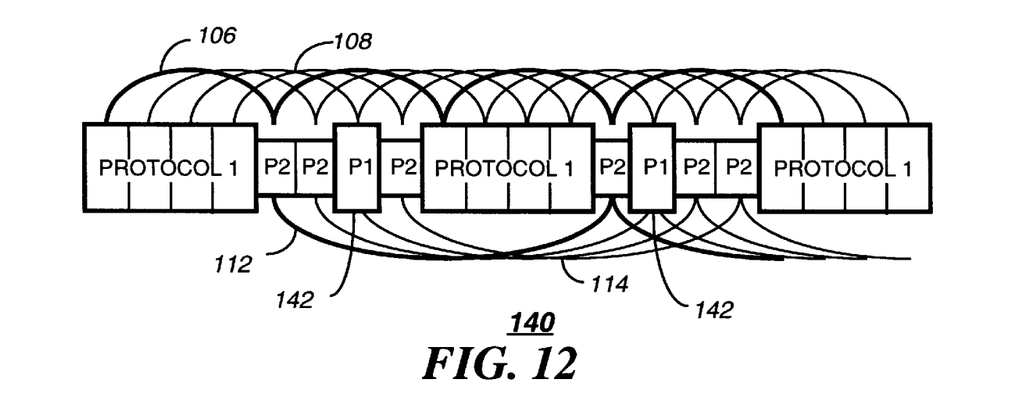
FIG. 12 is a graphic illustration of a first technique for dynamically incrementing capacity available for sending information in one of the protocols in accordance with the present invention.

FIG. 12 is a graphic illustration 140 of a first technique for dynamically incrementing capacity available for sending information in PROTOCOL 1 by utilizing at least one of the plurality of frame time slots 102 allocated to PROTOCOL 2 to send at least one frame of information in PROTOCOL 1. As pointed out herein above, because the PROTOCOL 1 receiving devices 10 do not utilize base frame management, they wake up during the frame time slots 102 allocated to PROTOCOL 2, as well. Thus, the system can send a message in a PROTOCOL 1 frame 142 during a frame time slot 102 normally allocated to PROTOCOL 2, and the PROTOCOL 1 receiving device 10 will receive the message. As explained earlier, the system preferably sends a protocol identifier near the beginning of each transmission frame. If a PROTOCOL 2 receiving device 10 wakes up and receives a non-PROTOCOL 2 transmission, the PROTOCOL 2 receiving device preferably returns immediately to a battery saving mode.

Figure 13:
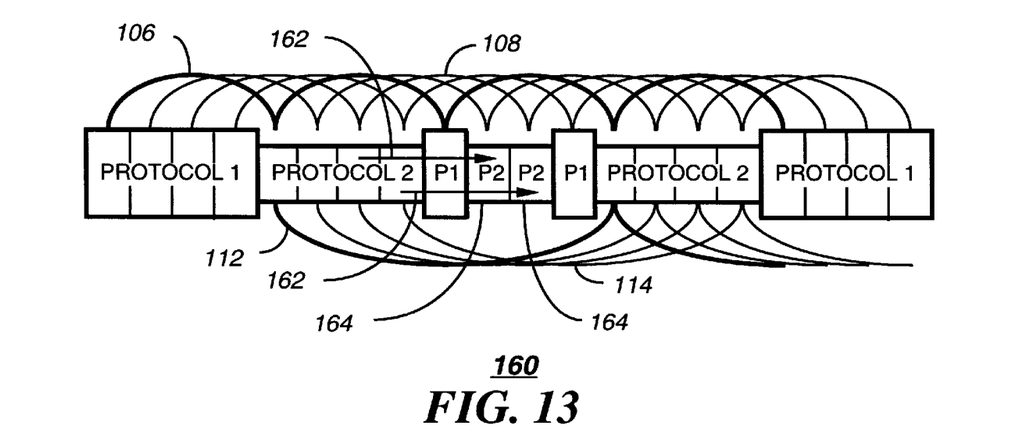
FIG. 13 is a graphic illustration of a second technique for dynamically incrementing capacity available for sending information in one of the protocols in accordance with the present invention.

FIG. 13 is a graphic illustration 160 of a second technique for dynamically incrementing capacity available for sending information in PROTOCOL 2 by instructing a portable selective call receiving device 10 utilizing PROTOCOL 2, to monitor a frame of information transmitted in one of the plurality of frame time slots 102 normally allocated to PROTOCOL 1. The second technique operates by sending an address and a vector during a frame time slot 102 allocated to PROTOCOL 2. The PROTOCOL 2 receiving device 10 for which the address and vector are intended can receive the address and vector, because the frame time slot 102 is allocated to PROTOCOL 2, and the receiving device 10 normally wakes up during the frame time slot 102. The vector, however, points to a vectored time slot 164 that is normally allocated to PROTOCOL 1, as depicted by the arrows 162. The vector preferably overrides the normal battery saving operation of the PROTOCOL 2 receiving device 10, as is done, for example, in receiving devices utilizing the ReFLEX™ protocol, and the receiving device 10 then wakes up during the vectored time slot 164 to receive the information.

Thus, it should be clear from the preceding disclosure that the present invention provides a method and apparatus for mixing protocols in a radio messaging system. The method and apparatus advantageously allows receiving devices utilizing one type of protocol to apply base frame management capability to perform battery saving throughout frame time slots that are allocated to another type of protocol. The method and apparatus also provides for dynamically incrementing capacity available for sending information in one type of protocol in a frame time slot normally allocated to another type of protocol. Many modifications and variations of the present invention are possible in light of the above teachings. Thus, it is to be understood that, within the scope of the appended claims, the invention may be practiced otherwise than as described herein above.

What is claimed is:

1. A method in a radio messaging system for mixing protocols, the method comprising the steps of:

allocating a first predetermined plurality of frame time slots to a first protocol;

allocating a second predetermined plurality of frame time slots to a second protocol having a base frame management capability, wherein the base frame management capability is applied such that portable selective call receiving devices utilizing the second protocol normally perform battery saving throughout the first predetermined plurality of frame time slots; and dynamically incrementing capacity available for sending information in the second protocol by instructing a portable selective call receiving device utilizing the second protocol, to monitor a frame of information transmitted in the first predetermined plurality of frame time slots.

2. The method of claim 1, wherein the portable selective call receiving devices that utilize the first protocol do not perform battery saving throughout the second predetermined plurality of frame time slots, and wherein the method further comprises the step of dynamically incrementing capacity available for sending information in the first protocol by utilizing at least one of the second predetermined plurality of frame time slots to send at least one frame of information in the first protocol.

3. The method of claim 1, wherein the first and second protocols are synchronous protocols, each comprising a frame cycle having a predetermined duration and comprising a plurality of frames to be sent in a predetermined number of frame time slots, and wherein the allocating steps together comprise the step of allocating the first and second predetermined pluralities of frame time slots such that they have a total duration equal to the predetermined duration of the frame cycle and such that a total count of the first and second predetermined pluralities of frame time slots is equal to the predetermined number of frame time slots.

4. A controller in a radio messaging system for mixing protocols, the controller comprising:

an input device for inputting user control signals for adjusting operation of the controller;

a processor coupled to the input device for processing messages according to the user control signals; and a memory coupled to the processor for storing software for programming the processor, wherein the processor is programmed to allocate a first predetermined plurality of frame time slots to a first protocol, and wherein the processor is further programmed to allocate a second predetermined plurality of frame time slots to a second protocol having a base frame management capability, and wherein the processor is further programmed to dynamically increment capacity available for sending information in the second protocol by instructing a portable selective call receiving device utilizing the second protocol, to monitor a frame of information transmitted in the first predetermined plurality of frame time slots, and wherein the base frame management capability is applied such that portable selective call receiving devices utilizing the second protocol normally perform battery saving throughout the first predetermined plurality of frame time slots.

5. The controller of claim 4, wherein the portable selective call receiving devices that utilize the first protocol do not perform battery saving throughout the second predetermined plurality of frame time slots, and wherein the processor is further programmed to dynamically increment capacity available for sending information in the first protocol by utilizing at least one of the second predetermined plurality of frame time slots to send at least one frame of information in the first protocol.

6. The controller of claim 4, wherein the first and second protocols are synchronous protocols, each comprising a frame cycle having a predetermined duration and comprising a plurality of frames to be sent in a predetermined number of frame time slots, and wherein the processor is further programmed to allocate the first and second predetermined pluralities of frame time slots such that they have a total duration equal to the predetermined duration of the frame cycle and such that a total count of the first and second predetermined pluralities of frame time slots is equal to the predetermined number of frame time slots.

7. A radio messaging system for mixing protocols, comprising:

a controller for receiving messages and for controlling a transmitter to transmit the messages, the controller comprising a processor;

the transmitter coupled to the controller for transmitting the messages; and portable selective call receiving devices coupled by radio to the transmitter for receiving the messages, wherein the processor is programmed to allocate a first predetermined plurality of frame time slots to a first protocol, and wherein the processor is further programmed to allocate a second predetermined plurality of frame time slots to a second protocol having a base frame management capability, and wherein the processor is further programmed to dynamically increment capacity available for sending information in the second protocol by instructing a portable selective call receiving device utilizing the second protocol, to monitor a frame of information transmitted in the first predetermined plurality of frame time slots, and wherein the base frame management capability is applied such that the portable selective call receiving devices utilizing the second protocol normally perform battery saving throughout the first predetermined plurality of frame time slots.

8. The radio messaging system of claim 7, wherein the portable selective call receiving devices that utilize the first protocol do not perform battery saving throughout the second predetermined plurality of frame time slots, and wherein the processor is further programmed to dynamically increment capacity available for sending information in the first protocol by utilizing at least one of the second predetermined plurality of frame time slots to send at least one frame of information in the first protocol.

9. The radio messaging system of claim 7, wherein the first and second protocols are synchronous protocols, each comprising a frame cycle having a predetermined duration and comprising a plurality of frames to be sent in a predetermined number of frame time slots, and wherein the processor is further programmed to allocate the first and second predetermined pluralities of frame time slots such that they have a total duration equal to the predetermined duration of the frame cycle and such that a total count of the first and second predetermined pluralities of frame time slots is equal to the predetermined number of frame time slots.

* * * * *